United States Patent
Ratcliff et al.

(10) Patent No.: US 6,435,469 B1
(45) Date of Patent: Aug. 20, 2002

(54) UMBRELLA MOUNT

(76) Inventors: William R. Ratcliff, 2626 E. 72nd St., Tulsa, OK (US) 74136; Terrell W. Harrison, P.O. Box 472121, Tulsa, OK (US) 74147-2121

(*) Notice: Subject to any disclaimer, the term of this patent is extended or adjusted under 35 U.S.C. 154(b) by 0 days.

(21) Appl. No.: 09/766,855

(22) Filed: Jan. 19, 2001

(51) Int. Cl.[7] .............................................. F16M 13/02
(52) U.S. Cl. ....................... 248/535; 248/314; 248/514; 248/213.2; 248/231.71; 248/286.1; 403/324
(58) Field of Search .................................. 248/514, 515, 248/534, 535, 213.2, 223.41, 231.71, 286.1, 295.11, 296.1, 297.21, 540, 691, 230.6, 312.1, 313, 291.1, 284.1, 541, 311.2; 135/16; 206/315.3; 224/274; 403/324; 292/175

(56) References Cited

U.S. PATENT DOCUMENTS

| | | | | |
|---|---|---|---|---|
| 351,669 A | | 10/1886 | Tosso ........................... 248/515 |
| 963,000 A | * | 6/1910 | Deihl ..................... 248/295.11 |
| 1,167,891 A | * | 1/1916 | Eisenhart ................. 248/291.1 |
| 1,743,133 A | * | 1/1930 | Grills et al. ................... 169/26 |
| 2,195,988 A | | 4/1940 | Hoeruegel ................. 248/314 |
| 3,148,851 A | | 9/1964 | Condon ..................... 248/515 |
| 3,304,035 A | | 2/1967 | Davis ......................... 248/516 |
| 3,310,270 A | * | 3/1967 | Ciancio ...................... 248/210 |
| 3,335,453 A | * | 8/1967 | Lovelace ....................... 16/82 |
| D237,941 S | | 12/1975 | Dotter .......................... D8/363 |
| 4,325,503 A | * | 4/1982 | Swinney ................... 224/148.1 |
| 4,570,894 A | | 2/1986 | Miele ........................ 248/534 |
| 4,606,523 A | * | 8/1986 | Statz et al. .................... 211/74 |
| 4,702,044 A | * | 10/1987 | Dominguez ..................... 52/86 |
| 4,711,422 A | | 12/1987 | Ibanez ........................ 248/515 |
| 4,784,360 A | * | 11/1988 | Mok ........................... 248/313 |
| 4,817,810 A | * | 4/1989 | Shull ........................... 220/741 |
| 4,880,133 A | * | 11/1989 | Cullinane ................... 220/482 |
| 5,105,958 A | * | 4/1992 | Patton ...................... 215/100 R |
| 5,232,137 A | * | 8/1993 | Devine ........................ 224/252 |
| 5,277,211 A | | 1/1994 | Hendershot .................. 135/16 |
| 5,320,263 A | * | 6/1994 | Kobylack .................... 206/217 |
| 5,361,950 A | * | 11/1994 | Signal et al. ................ 224/482 |
| 5,396,915 A | * | 3/1995 | Bomar ......................... 135/16 |
| 5,411,237 A | | 5/1995 | Dougherty ................... 248/534 |
| 5,431,364 A | | 7/1995 | Etter ........................... 248/514 |
| 5,626,320 A | * | 5/1997 | Burrell et al. ............. 248/230.6 |
| 5,836,327 A | * | 11/1998 | Davis .......................... 135/16 |
| 5,947,138 A | | 9/1999 | DeAngelis .................... 135/16 |
| 6,032,917 A | | 3/2000 | Shannon ..................... 248/514 |
| 6,082,694 A | | 7/2000 | Joyce ...................... 248/288.31 |
| 6,131,779 A | * | 10/2000 | Gendala .................... 224/148.1 |
| 6,199,819 B1 | * | 5/2001 | Churillo ...................... 248/540 |
| 6,283,334 B1 | * | 9/2001 | Mahaffey et al. ........... 222/175 |

FOREIGN PATENT DOCUMENTS

BE        511902 B1 * 6/1952 .............. 248/311.2

* cited by examiner

Primary Examiner—Leslie A. Braun
Assistant Examiner—Jon Szumny
(74) Attorney, Agent, or Firm—Frank J. Catalano

(57) ABSTRACT

A mount for supporting an open umbrella from an object has a bracket adapted to be secured to a portion of the object and a holder for supporting the umbrella. The holder has a receptacle adapted to receive and support the downwardly inserted handle of the umbrella and a yoke oriented to receive the shaft of the umbrella. A spring biased pin permits rapid insertion and removal of the shaft into and from the yoke. Preferably, the receptacle is slidably engaged relative to the yoke so that the umbrella canopy can be lowered to closely shield the object. A hinge connecting the holder to the bracket permits the umbrella to be positioned at any desired angle in relation to the object.

8 Claims, 5 Drawing Sheets

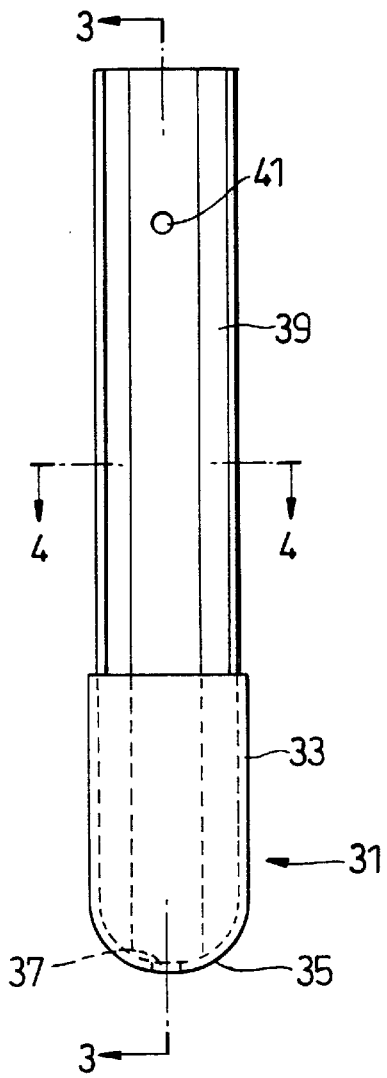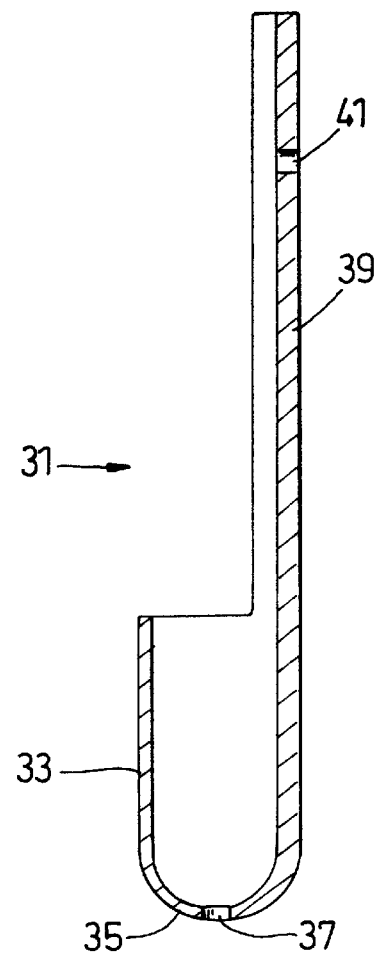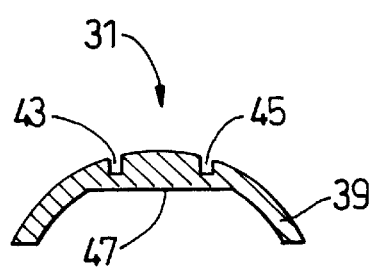
Fig. 2
Fig. 3
Fig. 4

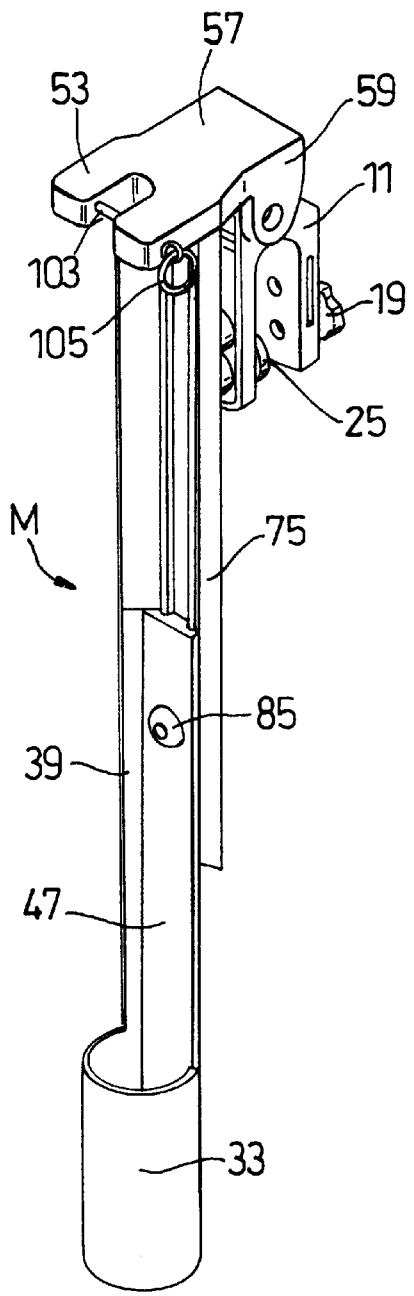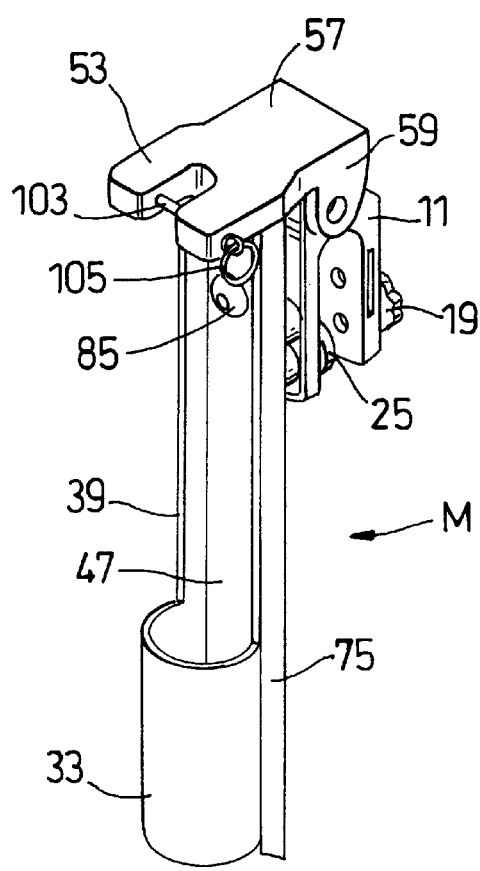
Fig. 9
Fig. 10

UMBRELLA MOUNT

BACKGROUND OF THE INVENTION

This invention relates generally to umbrella holders and more particularly concerns a mount for supporting an open umbrella from an object such as a golf bag, a barbecue grill or a piece of lawn furniture, for example.

A variety of holders for golf umbrellas have already been designed. Many use one or more arms to cantilever the umbrella holder outwardly and upwardly from a golf bag. Since the arms are relatively long, it is difficult to position the canopy of the umbrella in close enough relationship to the golf bag to adequately protect the bag and the clubs. Furthermore, the projecting arms of the holder make the golf bag difficult to handle, transport or store. Another unfortunate consequence of the cantilevered relationship is that the torque applied to the mount and to the golf bag by wind forces on the umbrella canopy can render the entire combination unstable and can also result in damage to the mount and the bag or other object to which the umbrella is attached.

Many of the mounts are designed to accommodate only one specific umbrella. Those which are more universal in nature generally employ clamping or gripping mechanisms which squeeze the umbrella handle or shaft, resulting in wear and damage to the umbrella at the clamping point. The specific application umbrella mounts are typically permanently attached to the umbrella. The universal mounts require inconvenient manipulation of clamp screws and the like in order to release and lock the umbrella from or to the mount. This inconvenience can be especially problematic, for example, in the course of a round of golf. The golfer normally carries the umbrella between shots, protecting both the golfer and the equipment as the golfer moves about the course, but mounts the umbrella during shots so as to protect the equipment while the golfer swings the club. Repetitive delays between shots to mount and dismount the umbrella cause unnecessary pressure and strain on the golfer and playing partners.

Most umbrella holders are not adjustable to vary the height of the umbrella canopy above the object to be protected. Those that are adjustable generally do not permit the umbrella handle to be lowered below the mount. Most are not adjustable to vary the angular relationship of the umbrella to the object. Those that are generally cantilever the umbrella in an awkward position relative to the object. Consequently, it is difficult to locate the canopy sufficiently close to adequately protect the object.

Finally, many of the mounts are specifically designed for use with particular objects, frequently golf bags, and are not universally usable with or easily transferrable to and from different objects.

It is, therefore, an object of this invention to provide an umbrella holder which is usable to support and umbrella form a variety of objects. Another object of this invention is to provide an umbrella holder which is usable to support a variety of umbrellas. A further object of this invention is to provide an umbrella holder which is easily detachable from one object for attachment to another object. Yet another object of this invention is to provide an umbrella holder which facilitates rapid mounting and dismounting of the umbrella to and from the mount. It is also an object of this invention to provide an umbrella holder which does not apply pressure to or a clamping grip on the umbrella. Still another object of this invention is to provide an umbrella holder which does not extend significantly upwardly or outwardly from the object. An additional object of this invention is to provide an umbrella holder which does not make transportation or storage of the object more difficult. A further object of this invention is to provide an umbrella holder which minimizes the torque applied to the mount and the object resulting from wind forces on the umbrella canopy. Yet another object of this invention is to provide an umbrella holder which supports the umbrella handle below the top of the handle so as to bring the canopy closer to the object. It is also an object of this invention to provide an umbrella holder which is easily adjustable to raise and lower the umbrella handle to bring the canopy into closer proximity to the protected object. Still another object of this invention is to provide an umbrella holder which is easily adjustable to change the angular relationship of the umbrella to the protected object.

SUMMARY OF THE INVENTION

In accordance with the invention, a mount is provided for supporting an open umbrella from an object such as, for example, a golf bag, a barbecue grill or a piece of lawn furniture. The mount has a bracket adapted to be secured to a portion of the object, and a holder for supporting the umbrella. The holder has a receptacle at its lower end adapted to receive and support a downwardly inserted handle of the umbrella and a yoke at its upper end oriented to receive a laterally inserted shaft of the umbrella. A closure is disposed on the yoke for preventing the inserted shaft from inadvertently slipping laterally out of the yoke. The preferred closure is a pin spring biased to extend across the open end of the yoke and withdrawable against the bias to permit insertion and removal of the shaft into and from the yoke. A hinge pivotally connects the upper end of the holder to the bracket to permit the umbrella to be positioned at any desired angle in relation to the object. The preferred hinge utilizes a clevis on the upper end of the holder with a portion of the bracket disposed in the clevis. A pivot pin extends through apertures aligned in the clevis and the bracket portion. A first locking mechanism cooperable with the hinge maintains the bracket and the holder in the selected angular relationship. The preferred first locking mechanism utilizes a head on one end of the pin and a nut threadedly engaged on the other end of the pin to clamp the bracket within the clevis.

Preferably, the holder has a first member with the receptacle at its lower end and a second member with the yoke at its upper end. The first and second members are slidably engaged to permit adjustment of the distance between the receptacle and the yoke so that the canopy of the umbrella can be lowered to closely shield the object. A second locking mechanism is cooperable with the first and second members to bind the members to each other at the desired spacing of the receptacle and yoke. The preferred second locking mechanism utilizes an elongated slot and an aperture in the members which are aligned to remain in registration during sliding displacement of the members. A bolt extending through the aperture and the slot and a nut are used to clamp the members together. It is preferred that the first and second members have cooperable tracks and channels for guiding the sliding displacement of the receptacle and the yoke.

BRIEF DESCRIPTION OF THE DRAWINGS

Other objects and advantages of the invention will become apparent upon reading the following detailed description and upon reference to the drawings in which:

FIG. 2 is a front elevation view of the umbrella handle receiving receptacle of the mount shown in FIG. 1;

FIG. 3 is a cross-sectional view taken along the line 3—3 of FIG. 2;

FIG. 4 is a cross-sectional view taken along the line 4—4 of FIG. 2;

FIG. 9 is a perspective view illustrating the umbrella mount of FIG. 1 with the umbrella handle receiving receptacle fully lowered;

FIG. 10 is a perspective view illustrating the umbrella mount of FIG. 1 with the umbrella handle receiving receptacle fully raised;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
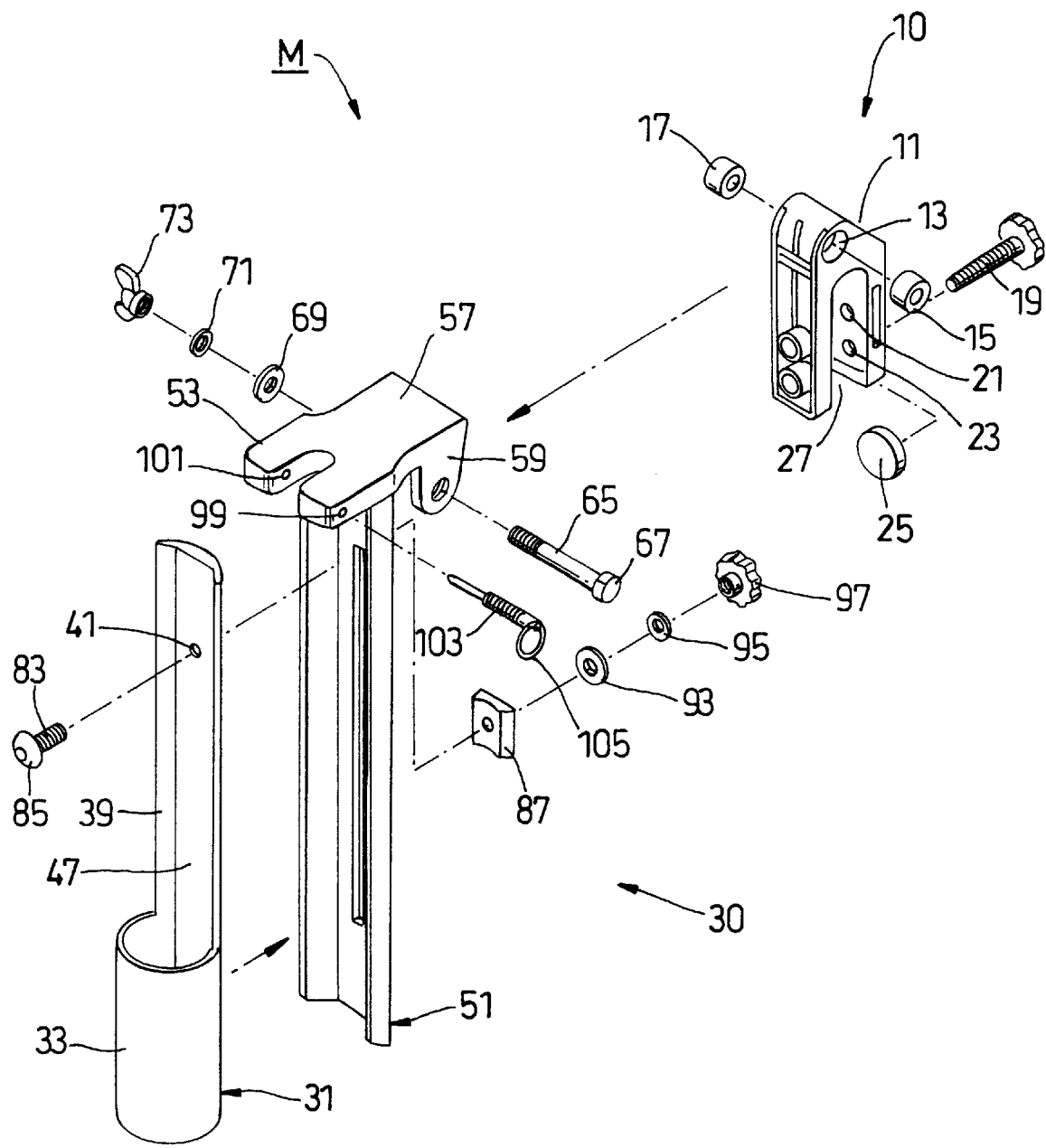
FIG. 1 is a perspective assembly view of a preferred embodiment of the umbrella mount.
Figure 5:
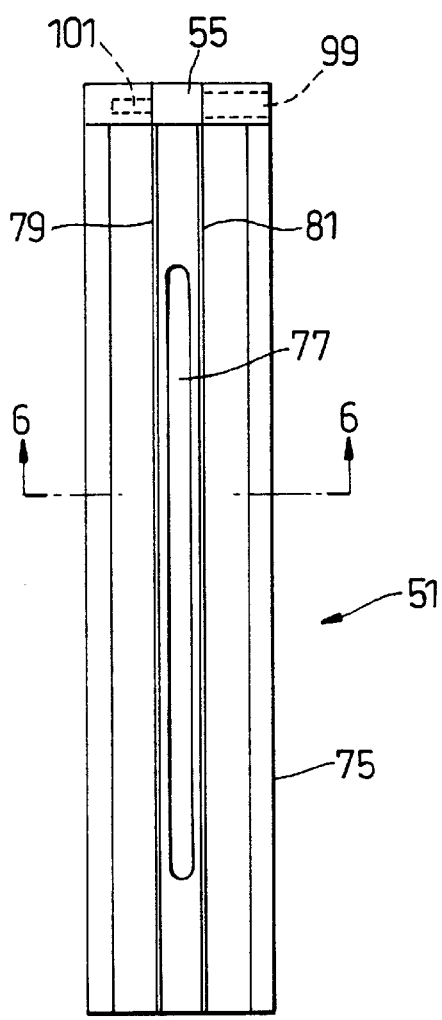
FIG. 5 is a front elevation view of the umbrella shaft receiving yoke of the mount shown in FIG. 1.
Figure 12:
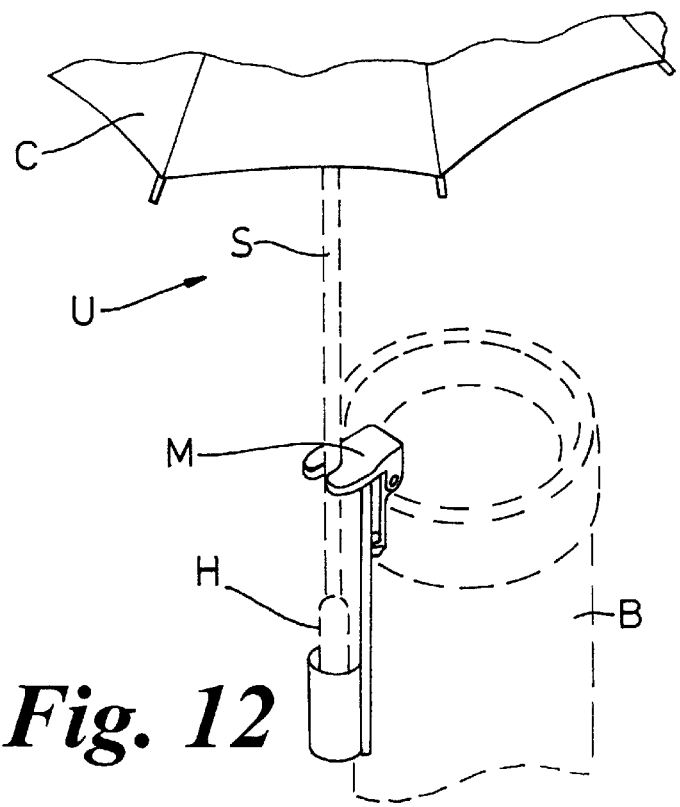
FIG. 12 is a perspective view of the umbrella mount of FIG. 1 supporting an open umbrella from the rim of a golf bag.

Turning first to FIGS. 1 and 12, a preferred embodiment of the mount M for supporting an open umbrella U from a golf bag B is illustrated. As shown in FIG. 1, the mount M includes a bracket 10 adapted to be secured to a portion of the object such as the golf bag B and a holder 30 adapted to support the umbrella U. The holder 30 is hinged to the bracket 10 to permit adjustment of the angular relationship of the umbrella U relative to the golf bag B. As shown, the holder 30 consists of first and second members 31 and 51 which are slidably engaged to permit variation in the elevation of the umbrella U in relation to the golf bag B.

The bracket 10 preferably consists of an n-shaped body 11 having a bore 13 through its upper portion with bearings 15 and 17 disposed in each end of the bore 13. A screw 19 is threadedly engaged in one of two apertures 21 or 23 provided in one leg of the n-shaped body 11 and a removable cap 25 is engaged on the end of the screw 19 within the cavity 27 between the legs of the body 1 1. As can best be seen in FIGS. 11 and 12, the rim of the bag B on which the mount is attached is received in the cavity 27 and the screw 19 tightened to firmly secure the rim of the bag B between the cap 25 and the leg of the body 11. The cavity 27 is adapted to receive not only the rim of the golf bag B but is also suitable to receive portions of many other objects such as the wall or shelf of a barbeque grill, a table top, an arm or back of a chair or lounge, a portion of a fence or the like.

Turning to FIGS. 2–4, a preferred embodiment of the first member 31 of the holder 30 is illustrated. The member 31 includes a receptacle 33 with a closed end 35 at its bottom. As shown, the receptacle 33 is a vertically aligned cylindrical cavity with an approximately hemispherical bottom. This configuration is preferred because the same receptacle 33 can receive the handle H of any straight handled umbrella U and the hemispherical contour of the bottom will permit the bottom end of the umbrella handle to be seated firmly against the receptacle lower end 35. However, the receptacle 33 could have other geometric shapes and the lower end 35 could be tapered other than hemispherically, provided the sidewalls of the receptacle 33 prevent lateral release of the umbrella handle H from the receptacle 33 and the closed end 35 supports the bottom end of the umbrella handle H. A drain hole 37 is provided in the bottom of the closed end 35. As seen in FIG. 3, an upward extension 39 from the top of the receptacle 33 has an aperture 41 near its upper end. The upward extension 39 extends from approximately the rear ¼ of the upper perimeter of the receptacle 33. As is best seen in FIG. 4, a pair of parallel grooves 43 and 45 spaced on either side of the aperture 41 extend along the outer wall of the extension 39 and the receptacle 33. Also, as best seen in FIG. 4, the inner wall of the receptacle 33 and the extension 39 is provided with a flat face 47, increasing the thickness of the grooved portion of the first member 31 to provide added strength.

Figure 11:
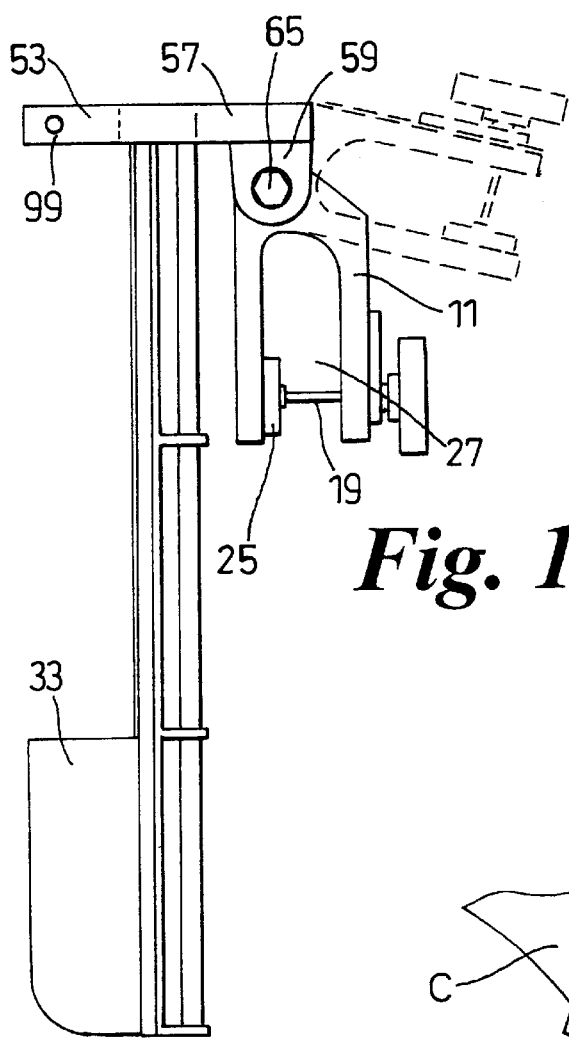
FIG. 11 is a side elevation view of the umbrella mount of FIG. 1 illustrating multiple angular positions of the umbrella holder relative to its bracket.

Turning to FIGS. 5–8, the second member 51 of the holder 30 is illustrated. The second member 51 has a yoke 53 horizontally aligned on its upper end so as to be able to laterally receive objects within its opening 55. The rear portion of the yoke 53 has an extension 57 with a downwardly depending clevis 59. Apertures 61 and 63 are aligned through the arms of the clevis 59. As is best seen in FIGS. 1 and 11, the clevis 59 is adapted to receive the upper portion of the bracket body 11 between its arms with the bore 13 of the body 11 aligned with the apertures 61 and 63 in the clevis 59. A pivot pin 65 with a head 67 inserted through the apertures 61 and 63 and the bearings 15 and 17 in the body aperture 13 hinges the second member 51 of the holder 30 to the bracket 10. shown, a flat washer 69, a lock washer 71 and a wing nut 73 at the threaded end of the pivot pin 65 permit the user to lock the holder 30 in any desired angular relationship to the bracket 11. The second member 51 also includes an extension 75 extending downwardly from the rear portion of the yoke 53 in front of the clevis 59. The downward extension 75 has a vertical slot 77 extending from near its upper to near its lower end between a pair of parallel tracks 79 and 81 extending along the front face of the second member 51. Comparing FIGS. 4 and 6, it can be seen that the front face of the second member 51 is contoured to compliment the rear face of the first member 31 with the tracks 79 and 81 of the second member slidably engaged in the grooves 43 and 45 of the first member. The slot 77 in the second member 51 maintains registration with the aperture 41 in the first member 31 as the first and second members 31 and 51 slide in relation to each other. As best seen in FIG. 1, a screw 83 extends through the aperture 41 in the first member 31 and the slot 77 in the second member 51. The head 85 of screw 83 abuts the flat face 47 of the first member 31. A guide block 87 is adapted to slide between a second pair of tracks 89 and 91 on the back face of the second member 51, as can best be seen in FIG. 6. A flat washer 93, lock washer 95 and nut 97 on the threaded end of the screw 83 permit the first and second members 31 and 51 to be locked in any desired relationship of extension of the receptacle 33 below the yoke 53. FIGS. 9 and 10 illustrate the umbrella mount M in fully extended and fully retracted states, respectively.

Figure 7:
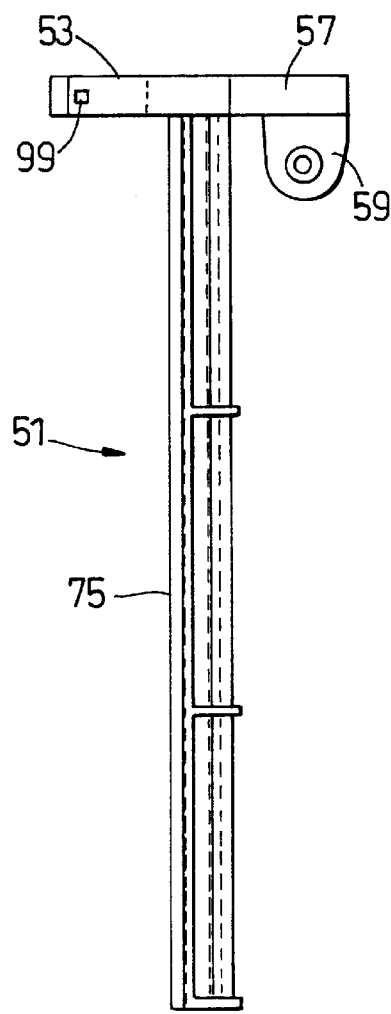
FIG. 7 is a side elevation view of the yoke of FIG. 5.
Figure 6:
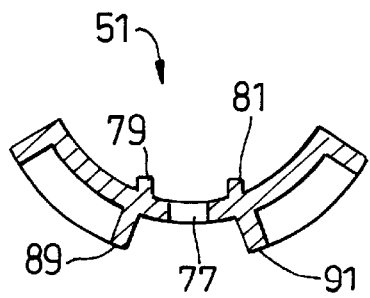
FIG. 6 is a cross-sectional view taken along the line 6—6 of FIG. 5.
Figure 8:
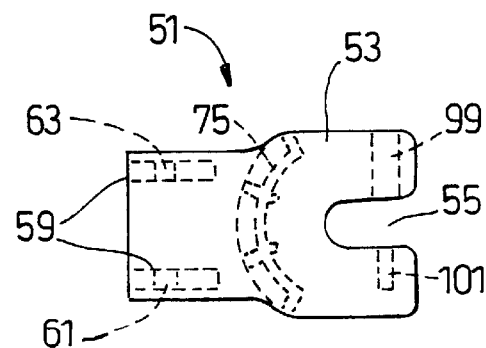
FIG. 8 is a top plan view of the yoke of FIG. 5.

Looking again at FIGS. 1, 7 and 8, the yoke 53 is provided with apertures 99 and 101 which receive a spring loaded pin 103 with a pull ring 105. In its normal condition, the pin 103 extends across the opening 55 of the yoke 53 so as to prevent objects from being inadvertently released laterally from the yoke 53. When the pull ring 105 is pulled against bias, the pin 103 is withdrawn from its position across the opening 55 so that objects can be easily laterally inserted and/or removed from the yoke 53.

To attach the mount M to the golf bag B, the bracket screw 19 is withdrawn to permit the rim of the golf bag B to be inserted between the cap 25 on the threaded end of the screw 19 and its opposed leg of the bracket body 11. With the bracket 11 seated firmly on the bag B, the screw 19 is tightened to firmly grip the rim of the bag B between the cap 25 and the opposite leg of the bracket 11. With the hinge or clevis pin 65 in a loosened condition, the holder 30 is adjusted in the bracket 10 to its desired angular position. The wing nut 73 is then tightened to secure the clevis 59 against the bracket 11 and lock the holder 30 in the selected angular position. The holder screw 83 is loosened and the first member 31 of the holder 30 slid in relation to the second member 51 of the holder 30 until the receptacle 33 and the yoke 53 are spaced to accommodate the umbrella U to be supported by the mount M and to establish the height of the umbrella canopy C over the bag B on which the umbrella U is supported. When the desired spacing between the receptacle 33 and yoke 53 is achieved, the holder nut 97 is tightened to lock the first and second members 31 and 51 in relation to each other. With the bracket 10 thus attached to the bag B and the holder 30 adjusted to the desired elevation and angle, the user pulls the ring 105 to withdraw the pin 103 from the yoke opening 55, lowers the bottom of the umbrella handle H into the receptacle 33 until it is seated at the bottom end 35 of the receptacle 33 inserts the shaft S of the umbrella U laterally into the opening 55 in the yoke 53 and releases the pull ring 105 to close the opening 55 in the yoke 53. Thus, the umbrella U is restrained against lateral movement at its bottom end by the receptacle 33 and at its shaft S by the yoke 53 and pin 103. The umbrella U is maintained at its desired elevation by the bottom or lower end of the receptacle 33. This is accomplished without applying any force or pressure to the components of the umbrella.

To remove the umbrella U from the mount M, the user simply pulls the pull ring 105 to withdraw the pin 103 from the opening 55 in the yoke 53, removes the umbrella shaft S laterally from the yoke 53 vertically raises the umbrella handle H from the receptacle 33 and releases the pull ring 105. Thus the umbrella U can be rapidly placed on or removed from the mount M. Furthermore, the mount M can be easily removed from one object and installed on another object using the procedure above outlined.

Thus, it is apparent that there has been provided, in accordance with the invention, an umbrella mount that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A mount for supporting an open umbrella from an object comprising:

a bracket adapted to be secured to a portion of the object;

a holder having a receptacle at a lower end thereof adapted to receive and support a handle of the umbrella downwardly inserted therein and to prevent the handle of the umbrella inserted downwardly therein from slipping laterally out of said receptacle and a yoke at an upper end thereof oriented to receive a shaft of the umbrella laterally inserted therein;

means disposed on said yoke for preventing the inserted shaft from inadvertently slipping laterally out of said yoke;

a hinge pivotally connecting said upper end of said holder to said bracket; and means cooperable with said hinge for locking said bracket and said holder in a selected angular relationship.

2. The mount according to claim 1, said hinge comprising a clevis on said upper end of said holder having apertures therethrough, a portion of said bracket disposed in said clevis having an aperture therethrough aligned with said clevis apertures and a pivot pin extending through said apertures.

3. The mount according to claim 2, said hinge locking means comprising a head on one end of said pin and a nut threadedly engaged on another end of said pin.

4. The mount according to claim 1, said preventing means comprising a pin spring biased to extend across an open end of said yoke and withdrawable against bias to permit insertion and removal of said shaft into and from said yoke.

5. A mount for supporting an open umbrella from an object comprising:

a bracket adapted to be secured to a portion of the object;

a holder having a first member with a receptacle at a lower end thereof adapted to receive and support a handle of the umbrella downwardly inserted therein and a second member with a yoke at an upper end thereof oriented to receive a shaft of the umbrella laterally inserted therein, said first and second members being slidably engaged to permit adjustment of a distance between said receptacle and said yoke;

means cooperable with said first and second members for locking said members in place relative to each other;

means disposed on said yoke for preventing the inserted shaft from inadvertently slipping laterally out of said yoke;

a hinge pivotally connecting said upper end of said holder to said bracket; and means cooperable with said hinge for locking said bracket and said holder in a selected angular relationship.

6. The mount according to claim 5, said first and second members having cooperable tracks and channels thereon for guiding sliding displacement of said receptacle and said yoke.

7. The mount according to claim 6, one of said first and second members having an elongated slot therein and the other of said first and second members have an aperture therethrough, said slot and said aperture being aligned for registration during said sliding displacement.

8. The mount according to claim 7, said member locking means comprising a bolt extending through said aperture and said slot to a nut.

* * * * *